June 24, 1930.  F. D. POWELL  1,766,940
STAND FOR VISIBLE INDEXES
Original Filed April 25, 1928   2 Sheets-Sheet 1
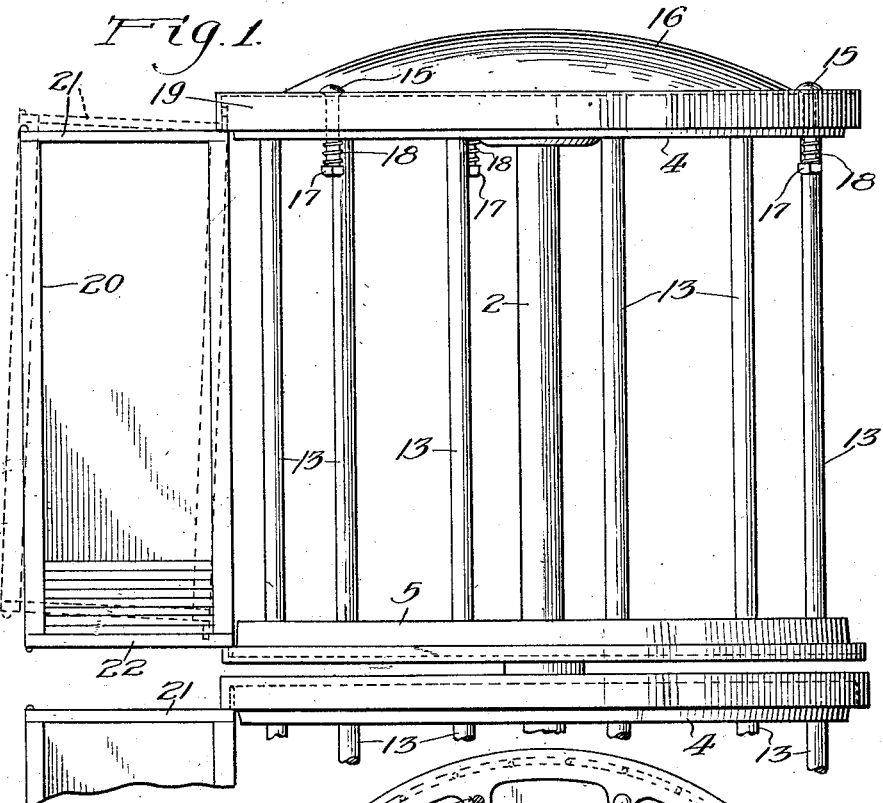
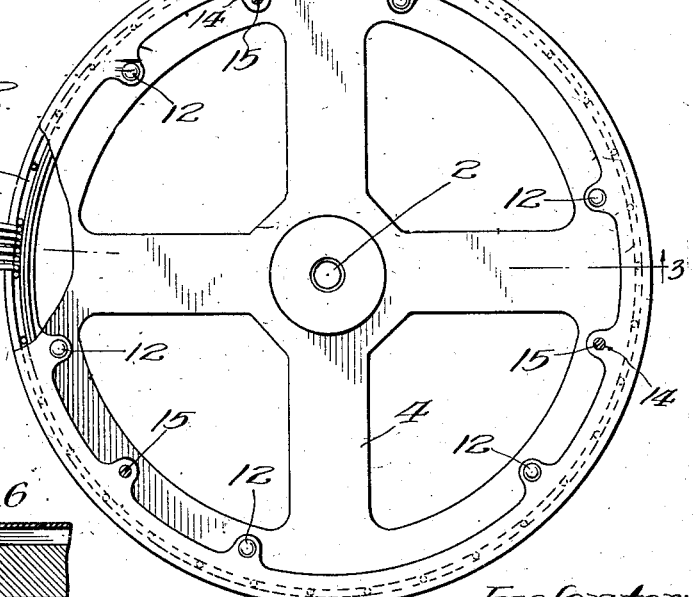
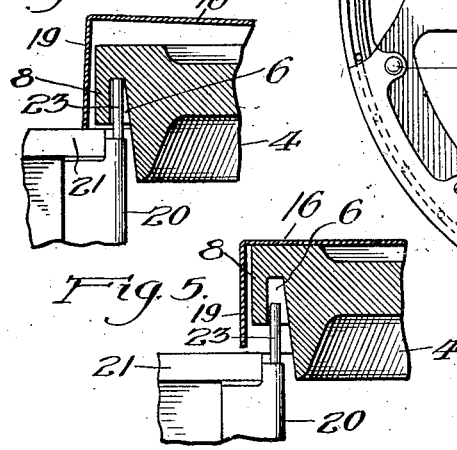
Inventor:
Frank D. Powell,
By Frank L. Belknap
Atty.

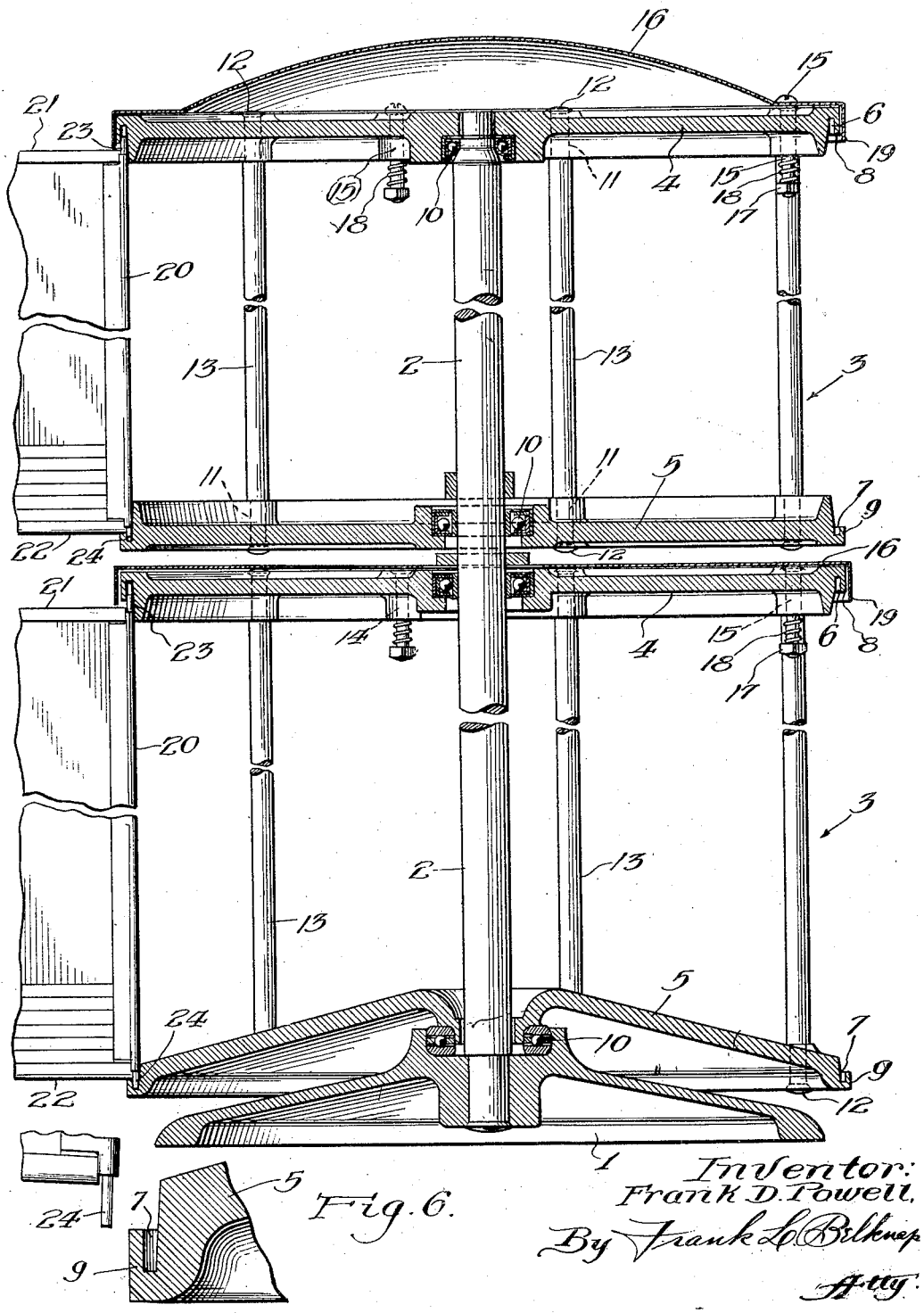

Patented June 24, 1930

1,766,940

UNITED STATES PATENT OFFICE

FRANK D. POWELL, OF CHICAGO, ILLINOIS, ASSIGNOR TO ACME CARD SYSTEM COMPANY, OF CHICAGO, ILLINOIS, A CORPORATION OF ILLINOIS

STAND FOR VISIBLE INDEXES

Application filed April 25, 1928, Serial No. 272,599. Renewed March 7, 1930.

The present improvements relate more particularly to a stand on which are adapted to be detachably mounted a plurality of frames, each containing visible index or record data, and in one specific embodiment comprises a revolving or rotary stand on which are mounted a large number of frames each containing a plurality of index strips, record cards, or other data readily visible to the eye.

An object of the present invention comprises the provision of means for permitting index frames to be easily and quickly mounted on, or removed from, said stand.

Various arrangements have been proposed in stands of this general character whereby the index frames may be easily and quickly mounted on, or removed from, the stand. A number of objections have arisen to the particular arrangements used heretofore, and the improvements of the present invention have been designed to overcome these objections and provide a combination by which the index frames may be easily and quickly mounted on, and removed from, the stand.

In designing the improvement of the present invention consideration was given to the important fact that the means for permitting easy and quick mounting or demounting of the frame relative to the stand must not in any way interfere with the means for securely locking the frame on a stand to prevent accidental displacement.

The improvement of the present invention, briefly described, comprises a movable plate cooperatively associated with the stationary frame of the stand through the medium of one or more spring tension devices. The stationary frame of the stand is provided with spaced downwardly and upwardly facing opposed grooves to receive the pintles projecting beyond the top and bottom edges of the index frame.

The movable plate is so constructed that the edge thereof projects below the edge of the wall confining one of the grooves. In operation, this edge of the movable plate is adapted to make contact with the edge of a frame being inserted in the stand, with the result that when force is applied to move the plate, the latter will be moving against the tension of the spring heretofore described, which preferably, though not necessarily, forms part of the locking connection between the stationary frame of the stand and said movable plate.

The movable plate is moved sufficiently to permit the insertion of the pintle of the index frame in a groove of the stand frame, whereupon the opposite pintle of the index frame will clear the wall confining the opposite groove of the stand frame and thus drop into the latter. When the latter pintle has been dropped into said opposite groove of the stand frame, the force which has maintained the movable plate in position against the tension of the spring is removed and the cover is restored to normal position through the medium of the expansion to normal position of said spring. One of the grooves may be preferably much deeper than the opposite groove to permit the pintle and index frame to be manipulated so that the pintle will clear the wall defining the opposite groove. In other words, in normal position the space between the end of the pintle and the wall defining the groove is at least sufficient to permit the opposite pintle to clear the wall defining the opposite groove.

The improvement of the present invention can be applied very easily and quickly to conventional and standard stands without materially altering or changing the construction of same. In addition, the use of the present invention does not entail any additional cost, either initially or in operation.

The overhanging edge of the movable plate just clears the edge of the index frame when the latter is in normal position so that said index frame can be swung on its pivot in the frame without friction, while at the same time said overhanging edge serves as a means of retaining the frame in the stand in addition to the outer wall defining the groove.

Various other objects, features and advantages will be hereinafter more particularly brought out.

In the drawings, Fig. 1 is a side elevational view illustrating a revolving type of stand equipped with the improvement of the present invention.

Fig. 2 is a top plan view of the construction shown in Fig. 1 with the movable plate removed and a part of the frame of the stand broken away for the sake of clearness.

Fig. 3 is a vertical sectional view taken on line 3—3 of Fig. 2.

Fig. 4 is an enlarged fragmentary sectional view illustrating the position of the movable plate moved upwardly in the insertion of an index frame.

Fig. 5 is a similar enlarged fragmentary sectional view showing the relative positions of the index frame, stand frame, and movable plate in normal positions.

Fig. 6 is an enlarged fragmentary sectional view of the lower groove in the stand to bring out the relative difference in depth between the grooves.

Referring more in detail to the drawings, 1 designates a base or spreading support from the center of which projects upwardly a shaft 2. This shaft 2 is adapted to support stands designated as a whole at 3.

In the drawings, the stand is illustrated as being of the revolving type. It is understood, of course, that the improvement which forms the basis of the present invention is equally applicable to non-revolving stands. Also, the drawing illustrates a conventional type of structure in which two separate stands are mounted on the same supporting shaft 2 in superposed relation. Each of the stands may be from six to twelve inches in height, more or less, and may be of a diameter to accommodate any desired number of index frames.

Each stand may comprise upper and lower discs 4 and 5 provided, respectively, with annular grooves 6 and 7 confined by walls 8 and 9, respectively. Each disc may take the form of a spider, that is, it is prefably internally cut away to reduce weight and save material.

Adjacent the outer edge of each of the spiders 4 and 5 are preferably disposed holes 11, in which are adapted to be inserted rivets, or the like, 12, the latter having cooperative engagement with the spaced upright supporting rods 13, thus combining the upper disc 4 and lower disc 5 into a unitary structure in which the two discs are spaced the desired distance from each other. This unitary structure is adapted for rotation relative to the shaft 2 through the medium of the ball bearing assembly 10.

As a feature of the present invention, between predetermined apertures 11, there may be provided other apertures 14 into which may be inserted the elongated pins or screw bolts 15. A movable plate 16 is illustrated as being supported on the upper edge of the upper disc 4, provided adjacent its outer edge with apertures into which are adapted to be inserted the pins 15, which latter, having enlarged heads, rest upon the upper surface of the movable plate 16. The operation will be described on the basis of providing the movable plate 16 on the top of the disc 4. It will be obvious that the movable plate 16 is equally applicable to the lower disc 5.

The arrangement is such that the pins 15 pass through the movable plate and through the spider 4 projecting below the latter a considerable distance. Each of the pins on its lower end may be provided with the adjustable nut 17 which functions to hold in place the coil spring 18 against the lower surface of the upper spider 4.

The outer edge 19 of the plate 16 may project beyond the outer edge of the wall 8 of the upper spider 4 for a purpose to be hereinafter described.

In the utilization of the invention, an index frame 20 having an upper edge 21, a lower edge 22, an upper pintle 23 and a lower pintle 24, is adapted to be mounted on the stand, being inserted into the grooves 6 and 7 and held on the stand in said grooves. Assume that it is desired to mount an index frame 20 on the stand. The upper pintle 23 is inserted in the groove 6 below the overhanging edge 19 of the plate 16, as illustrated in dotted lines at the left of Fig. 1. Pressure is applied to the frame, for instance, by hand, to force the pintle 23 upwardly to the point where the top edge of said pintle abuts against the top wall of groove 6. During this upward movement of the pintle, the upper edge 21 of the frame has made contact with the overhanging edge 19 of the top cover plate 16, thus raising that side of the top cover plate from its normal position, the top cover plate carrying with it the pin 15 and compressing the spring 18 against the lower surface of the spider 4. When the pintle 23 has made contact with the closed upper wall of the groove 6, the lower edge of the lower pintle 24 will have room enough to clear the upper edge of the wall 9 defining groove 7, thus permitting said lower pintle 24 to be inserted in the groove 7.

The frame is then moved or permitted to move downwardly until the lower edge of the lower pintle 24 rests in the wall defining the lower groove 7, whereupon the plate 16, under the influence of the spring 18, will also be restored to normal position. The frame at this point will occupy the position illustrated very clearly in Fig. 3.

It is to be noted, as heretofore pointed out, that the groove 6 is considerably deeper than the groove 7. The reason for this is obvious. The distance between the upper edge of the upper pintle and the upper wall defining groove 6 should be at least sufficient to permit the lower edge of the lower pintle 24 to clear the top edge of the wall 9 confining groove 7.

When it is desired to remove a frame from its place on the stand, the operation is reversed. Pressure is applied to the frame to raise it upwardly, thus causing the cover 16 to be raised because of contact with the upper edge 21 of the frame 20 until the lower edge of the lower pintle 24 clears the upper edge of the wall 9, at which time the frame can be entirely removed.

It is to be understood that any number of index frames 20 may be mounted on a given stand.

While I have illustrated a coil spring 18 associated with an elongated pin 15 as the means for maintaining the plate 16 under spring tension, it is obvious that the invention contemplates the use of any other form of spring, such as a flat blade spring or the like, cooperatively associating the movable cover 16 and the disc 4.

It is also to be understood that while I have shown the movable plate 16 as being disposed adjacent the upper disc 4, it can be reversed and associated with the lower disc 5 in an obvious manner.

I claim as my invention:

1. In combination, a stand comprising spaced upper and lower supports provided with inwardly facing opposed grooves confined by walls, a movable plate cooperatively connected with one of said supports having an edge lying in a different plane than the body portion of said plate and projecting beyond the edge of the wall confining the groove in that support, and means for maintaining said movable plate under spring tension.

2. In combination, a stand comprising spaced upper and lower supports provided with inwardly facing opposed grooves confined by walls, a movable plate cooperatively connected with one of said supports having an edge lying in a different plane than the body portion of said plate and projecting beyond the edge of the wall confining the groove in that support, an elongated pin passing through said plate and said support and having a portion projecting beyond the latter, a coil spring associated with that portion of the pin projecting beyond said support, and means associated with said pin for holding said spring against a surface of said support.

3. In combination, a stand comprising spaced upper and lower supports provided with inwardly facing opposed grooves confined by walls, a movable plate cooperatively connected with one of said supports having an edge lying in a different plane than the body portion of said plate and projecting beyond the edge of the wall confining the groove in that support, and means for maintaining said movable plate under spring tension whereby when forced away from its adjacent support to permit the insertion of an element in the grooves, said plate will be automatically restored to normal position.

4. In combination, a stand comprising spaced upper and lower supports provided with inwardly facing opposed recesses confined by walls, a movable plate cooperatively connected with one of said supports having an edge lying in a different plane than the body portion of said plate and projecting beyond the edge of the wall confining the recess in that support, and means for automatically restoring the movable plate to normal position when it has been moved from normal position.

5. In combination, a stand comprising spaced upper and lower supports provided with inwardly facing opposed recesses confined by walls, a movable plate cooperatively connected with one of said supports having an edge lying in a different plane than the body portion of said plate and projecting beyond the edge of the wall confining the recess in that support, and positive means for automatically restoring the movable plate to normal position when it has been moved from normal position.

6. In combination, a stand comprising spaced upper and lower annular supports provided with inwardly facing opposed recesses confined by walls, a movable plate cooperatively associated with one of said supports, having an edge projecting beyond the edge of the wall confining the recess in that support, and means for positively and automatically restoring the movable plate to normal position when it has been moved from normal position by the insertion or removal of an element in the recesses.

7. In an index or file, a supporting device for index leaves or the like comprising spaced apart annular supports, a plurality of index leaves detachably engaged thereby, vertically movable means to prevent the accidental disengagement of the leaves from said annular members, and positive means for automatically restoring the vertically movable means to normal position when the latter has been moved from normal position by the insertion or removal of one of the index leaves.

8. In an index or file, a supporting device for index leaves or the like comprising spaced apart annular supports provided with inwardly facing recesses confined by walls, a movable plate cooperatively connected with one of said supports having an annular flange projecting beyond the edge of the wall confining the curve in that support, and means for positively and automatically restoring the movable plate to normal position when it has been moved from normal position.

In testimony whereof I affix my signature.

FRANK D. POWELL.